(12) United States Patent
Joo et al.

(10) Patent No.: US 9,633,627 B2
(45) Date of Patent: Apr. 25, 2017

(54) POWER SUPPLY, POWER CONTROL METHOD THEREOF, AND DISPLAY APPARATUS HAVING THE SAME

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/826,600

(22) Filed: Aug. 14, 2015

(65) Prior Publication Data

US 2016/0050733 A1 Feb. 18, 2016

(30) Foreign Application Priority Data

Aug. 14, 2014 (KR) .................. 10-2014-0106162

(51) Int. Cl.

| | |
|---|---|
| H04N 5/63 | (2006.01) |
| H04N 5/57 | (2006.01) |
| G09G 5/10 | (2006.01) |
| H04N 21/485 | (2011.01) |
| H05B 33/08 | (2006.01) |
| G09G 3/34 | (2006.01) |

(52) U.S. Cl.
CPC .............. *G09G 5/10* (2013.01); *G09G 3/342* (2013.01); *H04N 5/57* (2013.01); *H04N 5/63* (2013.01); *H04N 21/4854* (2013.01); *H05B 33/086* (2013.01); *H05B 33/0815* (2013.01); *G09G 2320/064* (2013.01); *G09G 2320/0626* (2013.01); *G09G 2330/023* (2013.01); *Y02B 20/346* (2013.01)

(58) Field of Classification Search
CPC ....... G09G 2320/0626; H04N 21/4854; H04N 5/57
USPC ........ 348/687, 673, 730, 739; 345/204, 690, 345/691; 315/287, 291
See application file for complete search history.

(56) References Cited

U.S. PATENT DOCUMENTS 8,890,428 B2 * 11/2014 Ahn .................... G09G 3/00
315/210

FOREIGN PATENT DOCUMENTS

| KR | 20020041733 A | 6/2002 |
|---|---|---|
| KR | 1020080100000 A | 11/2008 |
| KR | 1020090075487 A | 7/2009 |
| KR | 101116188 B1 | 3/2012 |
| KR | 1020130119017 A | 10/2013 |
| KR | 1020130143025 A | 12/2013 |
| KR | 1020140000764 A | 1/2014 |

(Continued)

*Primary Examiner* — Michael Lee
*Assistant Examiner* — Jean W Desir
(74) *Attorney, Agent, or Firm* — Sughrue Mion, PLLC

(57) ABSTRACT

A power supply and method of controlling power supplied to a light source are disclosed. The power supply includes a dimming-control voltage generator configured to generate a dimming-control voltage based on first and second adjustment values; a dimming controller configured to output a dimming control signal for controlling analog dimming and pulse width modulation (PWM) dimming of a light source based on the dimming-control voltage; and a driver configured to control the analog dimming and the PWM dimming of the light source based on the dimming control signal.

25 Claims, 9 Drawing Sheets

(56) References Cited

FOREIGN PATENT DOCUMENTS

KR  1020140028926 A  3/2014
KR  1020140055031 A  5/2014

* cited by examiner

POWER SUPPLY, POWER CONTROL METHOD THEREOF, AND DISPLAY APPARATUS HAVING THE SAME

CROSS-REFERENCE TO RELATED APPLICATION

This application claims priority from Korean Patent Application No. 10-2014-0106162, filed on Aug. 14, 2014 in the Korean Intellectual Property Office, the disclosure of which is incorporated herein by reference in its entirety.

BACKGROUND

Field

Apparatuses and methods consistent with the exemplary embodiments relate to a power supply, a power control method thereof and a display apparatus having the same, and more particularly to a power supply, a power control method thereof and a display apparatus having the same, in which analog dimming and pulse width modulation (PWM) dimming for adjusting optical power of a light source such as a backlight unit of a display are performed by one circuit.

Description of the Related Art

In general, a display apparatus such as a television (TV) includes a power supply. For example, a switching mode power supply (SMPS) may be used to supply operation power to a power supplying target such as a display, etc. The power supply receives commercial alternating current (AC) power and converts the commercial AC power into operation power having a level needed for the power supplying target, thereby supplying the operation power to the power supplying target.

If the power supplying target is a light source, for example, a light emitting diode (LED) bar of the backlight unit, the power supply has to control optical output of the LED bar based on an image displayed on the display. To this end, the power supply typically uses one of the analog dimming and the PWM dimming to adjust the optical output of the LED bar.

However, both dimming methods have some problems. Specifically, the analog dimming adjusts average current intensity of the LED bar, and therefore may cause change in LED color as the LED bar is driven by different currents. The PWM dimming changes a duty cycle to which the maximum current for operating the LED bar is applied, and thus rapidly repeats an operation of turning on and off the LED bar for a short period of time. Therefore, the PWM dimming has to keep turning on and off the LED bar at a frequency higher than a certain bandwidth, e.g., about 200 Hz, so that a viewer cannot feel any flicker.

To resolve these problems, a hybrid dimming method was proposed recently, which enables the power supply to selectively perform one of the analog dimming and the PWM dimming as necessary.

However, the hybrid dimming method also has problems that circuit configurations are complicated and its design and maintenance are difficult. This is because the power supply needs both a circuit for the analog dimming and a circuit for the PWM dimming. Further, a response characteristic is deteriorated when the analog dimming is switched to the PWM dimming.

SUMMARY

An aspect of exemplary embodiments provides a power supply, a power control method thereof and a display apparatus having the same, in which analog dimming and pulse width modulation (PWM) dimming for adjusting optical power of a light source such as a backlight unit of a display are performed by one circuit.

According to an aspect of an exemplary embodiment, there is provided a power supply which includes a dimming-control voltage generator configured to generate a dimming-control voltage based on at least one adjustment value related to dimming of a light source; a dimming controller configured to output a dimming control signal for controlling analog dimming and pulse width modulation (PWM) dimming of the light source based on the dimming-control voltage; and a driver configured to control the analog dimming and the PWM dimming of the light source based on the dimming control signal.

The at least one adjustment value comprises an image brightness-adjustment value and a light-source power-adjustment value.

The dimming-control voltage generator may include a pulse signal generator configured to generate a control-pulse signal based on the adjustment values; and a voltage generator configured to generate the dimming-control voltage based on the control-pulse signal generated by the pulse signal generator.

The pulse signal generator may include one of a brightness controller included in a signal processor for processing a video signal, and a brightness controller for controlling the brightness of the light source.

The control-pulse signal may comprise a composite PWM signal comprising a first PWM signal having a first duty ratio for controlling the analog dimming and a second PWM signal having a second duty ratio for controlling the PWM dimming, wherein an on-section of the second PWM signal corresponds to a section of the first PWM signal.

The voltage generator may generate the dimming-control voltage based on an average level voltage of the first PWM signal.

The voltage generator may include a photo coupler configured to be turned on and off in accordance with pulses of the control-pulse signal; a capacitor configured to smooth a voltage output from the photo coupler when the photo coupler is turned on; and at least one resistor configured to connect with the photo coupler and adjust the voltage output from the photo coupler to generate the dimming control voltage.

The dimming controller may calculate an output current to be supplied to the light source based on the dimming-control voltage, and output the dimming control signal based on the calculated output current.

The dimming controller may output a first dimming control signal for the analog dimming of the light source when the dimming-control voltage is within a predetermined analog dimming voltage area.

The driver may control power supplied to the light source to be changed in proportion to the dimming-control voltage based on the first dimming control signal output from the dimming controller.

The dimming controller may output a second dimming control signal for the PWM dimming of the light source when the dimming-control voltage is within a PWM dimming voltage area below a predetermined voltage.

The driver may control the light source to be turned off based on the second dimming control signal output from the dimming controller.

The driver may include a switch configured to switch on and off based on the dimming control signal; and a light source controller to control the analog dimming and PWM dimming of the light source using on and off switching of the switch.

The light source controller may include a transformer configured to transform power into a voltage having a level needed for dimming the light source; and a capacitor configured to smooth the voltage output from the transformer and supply the smoothed voltage to the light source.

The driver may include a voltage controller configured to control the analog dimming of the light source based on a first dimming control signal output from the dimming controller; and a switch configured to control the PWM dimming of the light source based on a second dimming control signal output from the dimming controller.

The switch may include a field effect transistor (FET) configured to switch on and off based on the second dimming control signal.

The light source may include a plurality of power channels.

According to another aspect of an exemplary embodiment, there is provided a power control method, and the method includes generating a dimming-control voltage based on at least one adjustment value related to dimming of a light source; outputting a dimming control signal for controlling analog dimming and pulse width modulation (PWM) dimming of the light source based on the generated dimming-control voltage; and controlling the analog dimming and the PWM dimming of the light source based on the output dimming control signal.

The at least one adjustment value may include an image brightness-adjustment value and a light-source power-adjustment value.

The generating the dimming-control voltage may include generating a control-pulse signal based on the adjustment values; and generating the dimming-control voltage based on the generated control-pulse signal.

The outputting the dimming control signal may comprise calculating an output current to be supplied to the light source based on the dimming-control voltage, and outputting the dimming control signal based on the calculated output current.

The outputting the dimming control signal may comprise outputting a first dimming control signal for the analog dimming of the light source when the dimming-control voltage is within a predetermined analog dimming voltage area.

The controlling may comprise controlling power supplied to the light source to be changed in proportion to the dimming-control voltage based on the output first dimming control signal.

The outputting the dimming control signal may comprise outputting a second dimming control signal for the PWM dimming of the light source when the dimming-control voltage is within a PWM dimming voltage area below a predetermined voltage.

The controlling may comprise controlling the light source to be turned off based on the output second dimming control signal.

According to another aspect of an exemplary embodiment, there is provided a display apparatus which includes a signal receiver configured to receive a video signal; a signal processor configured to process a video signal received in the signal receiver; a display configured to display an image based on the video signal processed by the signal processor, comprising a display panel and a light source for illuminating the display panel, and; and a power supply configured to supply the operation power for driving the light source of the display, wherein the power supply includes: a dimming-control voltage generator configured to generate a dimming-control voltage based on at least one adjustment value related to dimming of a light source; a dimming controller configured to output a dimming control signal for controlling analog dimming and pulse width modulation (PWM) dimming of the light source based on the dimming-control voltage; and a driver configured to control the analog dimming and the PWM dimming of the light source based on the dimming control signal.

The power supply may further include a user input receiver configured to receive the at least one adjustment value as a user input.

BRIEF DESCRIPTION OF THE FIGURES

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Hereinafter, a power supply according to exemplary embodiments, a power control method thereof and a display apparatus having the same will be described with reference to accompanying drawings.

Figure 1:
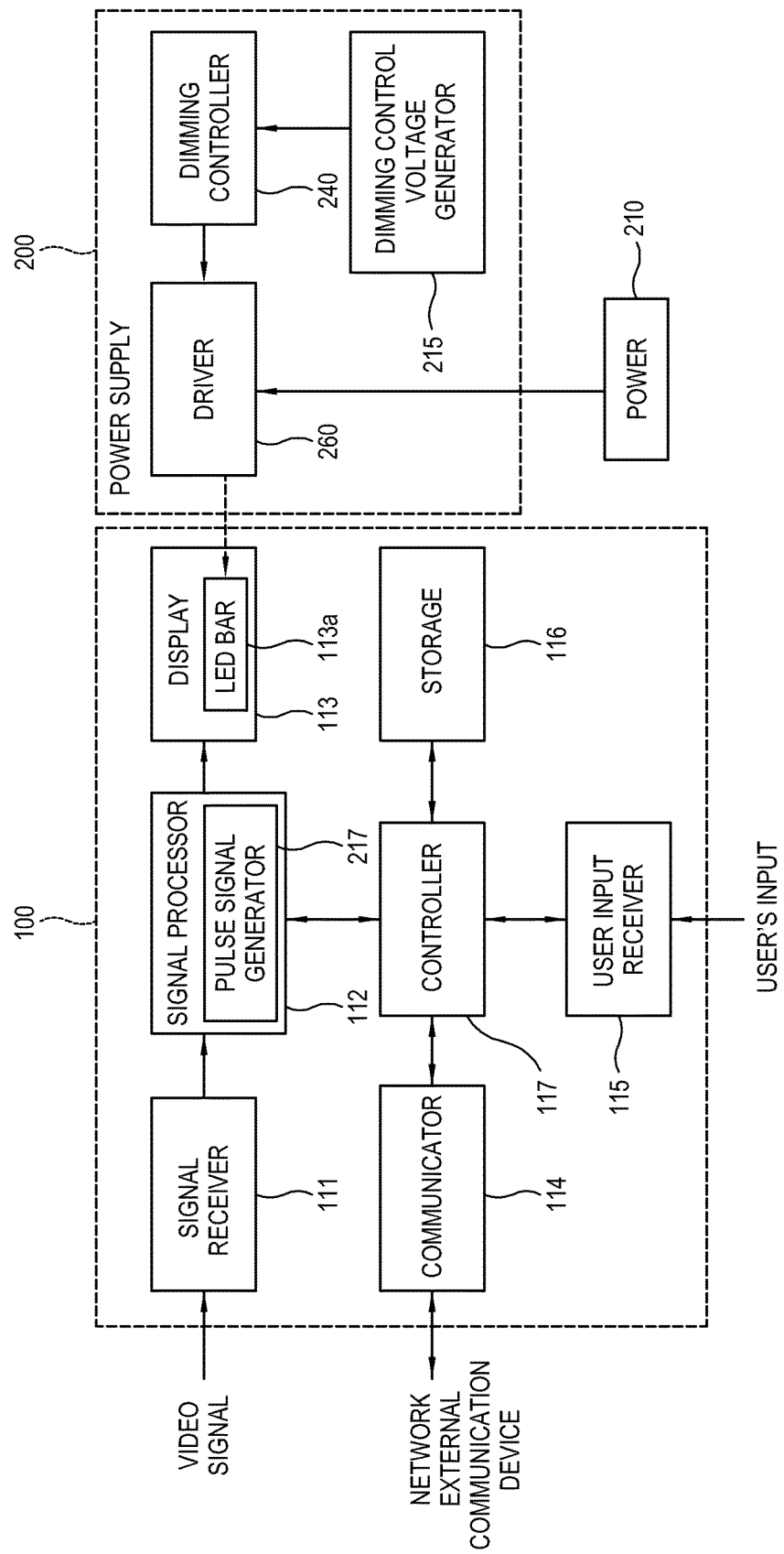
FIG. 1 is a block diagram of a display apparatus with a power supply according to an exemplary embodiment.

FIG. 1 is a block diagram of a display apparatus 100 with a power supply according to an exemplary embodiment.

The display apparatus 100 may be a television (TV) or the like, and receives and processes a video signal, thereby displaying an image based on the video signal.

The display apparatus 100 shown in FIG. 1 includes a signal receiver 111, a signal processor 112, a display 113, a communicator 114, a user input receiver 115, a storage 116 and a controller 117.

The signal receiver 111 receives a video signal from the exterior. The video signal received in the signal receiver 111 may include a broadcast signal, such as a digital television (DTV) signal, a cable broadcast signal, etc. In this case, the signal receiver 111 may be tuned to a channel selected by a user under control of the controller 117 and receives a broadcast signal through the tuned channel.

Further, the video signal received in the signal receiver 111 may include a signal output from a video source or apparatus, such as a digital versatile disc (DVD), a Blu-ray disc, etc.

In addition, the signal receiver 111 may receive other type of signals, such as an audio signal for outputting sound, a data signal for outputting information, etc. The video signal, the audio signal and the data signal may be multiplexed and received through one signal.

The signal processor 112 performs predetermined signal processing with regard to the video signal received in the signal receiver 111 so that the display 113 can display an image included in the video signal. The signal processor 112 may perform video processing which may include decoding, image enhancing, scaling, etc. Further, the signal processor 112 may perform signal processing with regard to the audio signal and the data signal received through the signal receiver 111.

The display 113 displays an image based on a video signal processed by the signal processor 112. The display 113 may employ a light emitting diode (LED) to display an image. In this case, the display 113 may further include an LED panel, a backlight unit for illuminating the LED panel. In addition, the display 113 may display information based on the data signal processed by the signal processor 112.

The display apparatus 100 may further include a sound output portion such as a loudspeaker to output a sound based on the audio signal processed by the signal processor 112.

The communicator 114 communicates with other devices through a network such as Internet. Further, the communicator 114 may communicate with nearby devices through a short-range communication protocol such as Bluetooth. Under control of the controller 117, the communicator 114 sends and receives information to and from the other party. The information received from the other party through the communicator 114 may include at least one of video, audio and data. The information is correspondingly processed by the signal processor 112.

The user input receiver 115 receives a user's input. For example, the user input receiver 115 may be achieved by a remote controller, a control panel, etc. The user input receiver 115 may include an input key for selectively turning on or off the display apparatus 100. A user's input received in the user input receiver 115 is transmitted to the controller 117.

The storage 116 is to store data or information for the display apparatus 100, and may include a flash memory, a hard disk drive, or the like.

The controller 117 is to control overall elements of the display apparatus 100, and may include a firmware as a control program and include a central processing unit (CPU) and a random access memory (RAM) for executing the firmware.

The display apparatus 100 may further include a power supply 200 to supply operation power to the elements of the display apparatus 100, such as the display 113, etc. The power supply 200 receives commercial alternating current (AC) power 210, transforms the power into power having levels needed for operating the respective elements, and supplies the transformed power to the corresponding elements.

Figure 2:
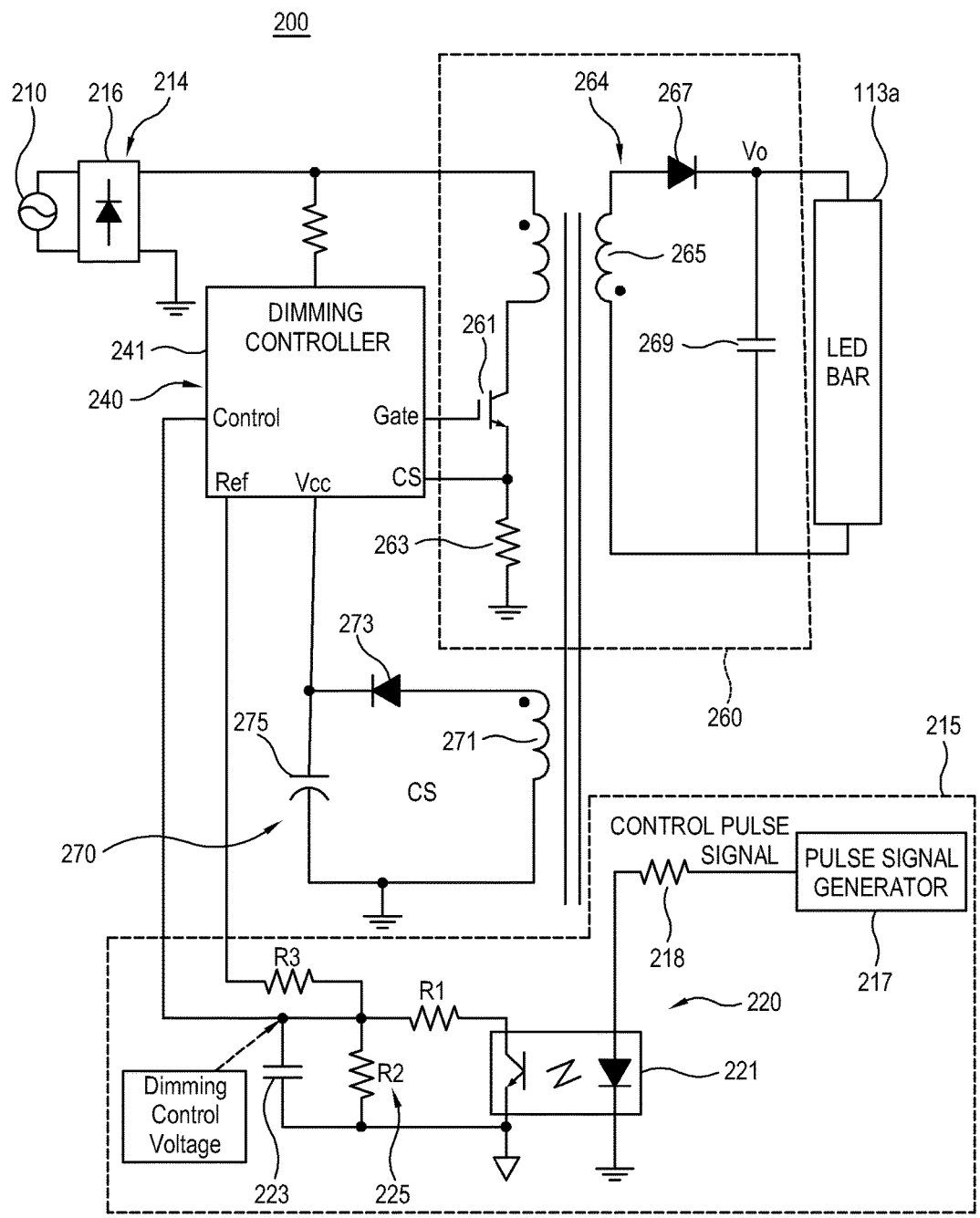
FIG. 2 is a circuit diagram of the power supply according to an exemplary embodiment.

Referring to FIG. 1 and FIG. 2, the power supply 200 according to an exemplary embodiment is used as a primary side regulation (PSR) converter for transforming an AC voltage output from an AC power source 210 to a direct current (DC) voltage through a rectifier 214 and provides an operation power to a light source of the display 113, i.e., the LED bar 113a of a backlight unit. The power supply 200 includes the rectifier 214, a dimming-control voltage generator 215, a dimming controller 240, and a driver 260.

The rectifier 214 rectifies a current output from the AC power source 210, thereby converting AC into DC. For example, the rectifier 214 may be implemented using a bridge diode 216, but is not limited thereto.

The dimming-control voltage generator 215 generates a dimming-control voltage in accordance with a control-pulse signal based on a brightness adjustment value input by a user through the user input receiver 115 and a video signal received from the signal processor 112.

The dimming-control voltage generator 215 includes a pulse signal generator 217 and a voltage generator 220.

Figure 3:
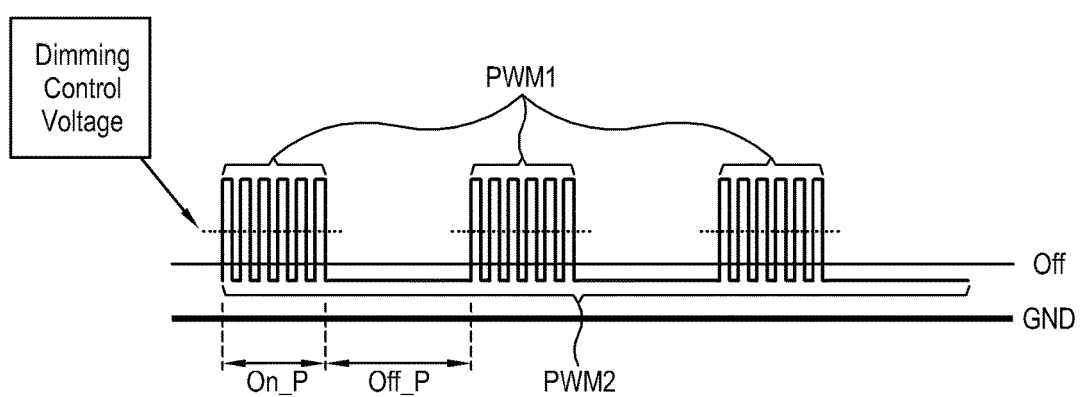
FIG. 3 is a waveform graph of a control-pulse signal used in the power supply according to an exemplary embodiment.

The pulse signal generator 217 generates a control-pulse signal, as shown in FIG. 3, based on a backlight power-adjustment value and an image brightness-adjustment value. These values may be input through the user input receiver 115 and a menu screen may be displayed on the display 113 under control of the controller 117 for convenience of the user inputting the values.

The backlight power-adjustment value sets a condition for a user display (UD). For example, it may include at least one first setting value which sets a maximum power to be applied in dimming the LED bar 113a. The maximum power may be set to a value satisfying a low-consumption power condition, instead of a value corresponding to a maximum power allowed in dimming the LED bar 113a. The low-consumption power condition refers to a power applying condition capable of obtaining a high dimming efficiency with regard to the supplied power. For example, if a maximum current value (or maximum voltage value) allowed in dimming the LED bar 113a is 500 mA (or 4V), and a user sets the first setting value for the backlight power-adjustment value to a current value (or voltage value) of 450 mA (or 3V), the LED bar 113a is dimmed within a maximum limit of 450 mA.

Further, the image brightness-adjustment value may include second setting values for adjusting the brightness of the LED bar 113a into a plurality of levels, for example, twenty levels.

The backlight power-adjustment value and the image brightness-adjustment value may be set to predetermined default values when there is no user's input.

FIG. 3 is a waveform graph of a control-pulse signal according to an exemplary embodiment.

The control-pulse signal is a single synthesized signal or composite PWM signal where a first PWM signal PWM1 for controlling an analog dimming and a second PWM signal PWM2 for controlling a PWM dimming are mixed. The first PWM signal PWM1 has a first duty ratio, and the second PWM signal PWM2 has a second duty ratio where a section corresponding to the first PWM signal is an on-section On_P.

The first duty ratio of the first PWM signal PWM1 and a maximum level value of the dimming-control voltage (or current) may be determined in accordance with the first setting value of the backlight power-adjustment value input by the user. Further, the second duty ratio of the second PWM signal PWM2 may be determined in accordance with the second setting value of the image brightness-adjustment value input by the user.

In FIG. 2, the pulse signal generator 217 is illustrated as being included in the dimming-control voltage generator 215 of the power supply 200. However, the pulse signal generator 217 for generating such a control-pulse signal may be implemented with a brightness controller included in the signal processor 112 as illustrated in FIG. 1. In this case, the brightness controller may include a control-pulse signal generating program to generate the control-pulse signal based on the backlight power-adjustment value and the image brightness-adjustment value input by the user. An application-specific integrated circuit (ASIC) may be designed to implement the control-pulse signal generating program.

If the power supply 200 according to this exemplary embodiment is used for an illumination apparatus instead of the display apparatus 100, the pulse signal generator may be implemented with a brightness controller of a light.

The voltage generator 220 generates a dimming-control voltage in accordance with a control-pulse signal generated by the pulse signal generator 217. To this end, the voltage generator 220 includes a photo coupler 221, the first capacitor 223, and a resistance portion 225.

The photo coupler 221 is turned on and off to output the same waveform as that of the control-pulse signal in accordance with pulses of the control-pulse signal input via a resistor 218 from the pulse signal generator 217.

Figure 4:
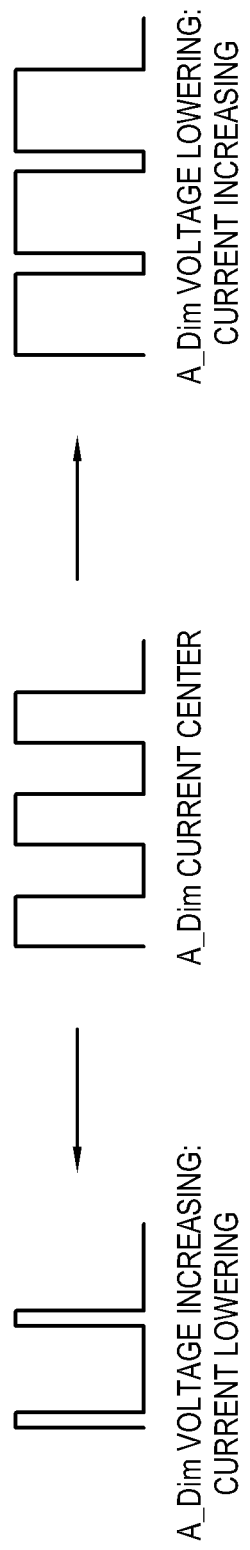
FIG. 4 is a waveform graph showing a relationship between voltage and current in accordance with a duty ratio of the control-pulse signal according to an exemplary embodiment.

The first capacitor 223 smooths a voltage output when the photo coupler 221 is turned on, and the smoothed voltage is input to the control pin of the dimming controller 240, as a dimming-control voltage. Therefore, the dimming-control voltage input to the dimming controller 240 may be an average level voltage having the same duty ratio as the first PWM signal PWM1. If the average level voltage of the first PWM signal PWM1 is high (see the left side of FIG. 4), a current input to the dimming controller 240 is low. On the other hand, if the average level voltage of the first PWM signal PWM1 is low, the current input to the dimming controller 240 is high (see the right side of FIG. 4).

The resistance portion 225 includes a first resistor R1 connected in series to the photo coupler 221 at a collector side of the photo coupler 221, a second resistor R2 connected in parallel to the photo coupler 221 and the first resistor R1, and a third resistor R3 connected in series to the second resistor R2 and connected in parallel to the first resistor R1. The resistors R1, R2 and R3 are used to adjust the level of the dimming-control voltage supplied to the dimming controller 240. The dimming controller 240 supplies a reference voltage through the reference voltage pin Ref in accordance with the first setting value of the backlight power-adjustment value input by a user. The reference voltage is determined to obtain the dimming-control voltage having the maximum voltage level within a range VS (see FIG. 5) corresponding to the first setting value. For example, if a user sets the first setting value for the backlight power-adjustment value to 3V, the reference voltage is determined so that the voltage generator 220 can generate the dimming-control voltage having a level up to 3V.

The dimming controller 240 controls the analog dimming and the PWM dimming of the LED bar 113*a* in accordance with the dimming-control voltage supplied from the voltage generator 220.

Specifically, the dimming controller 240 calculates an output current to be supplied to the LED bar 113*a* in accordance with the dimming-control voltage supplied from the voltage generator 220, and outputs a dimming control signal to control the driver 260 in accordance with the calculated output current.

Figure 5:
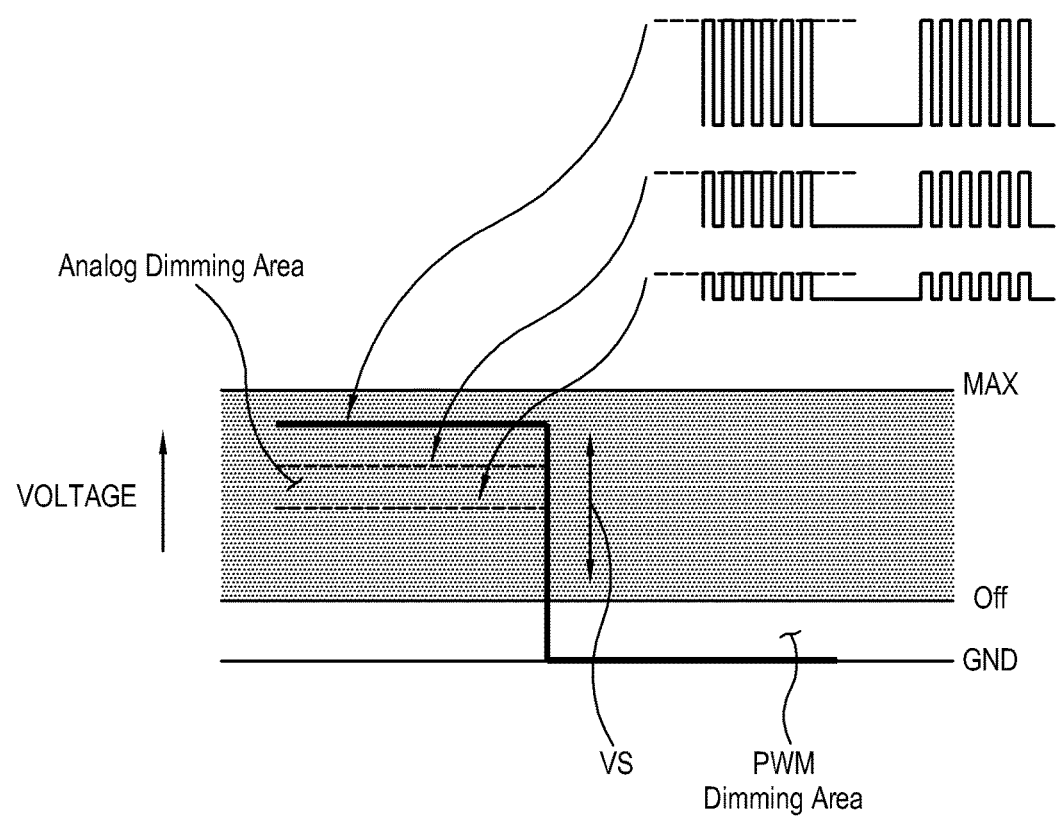
FIG. 5 is a waveform graph showing a hybrid dimming-control area for controlling dimming of a light source in accordance with the control-pulse signal according to an exemplary embodiment.

As shown in FIG. 5, the dimming controller 240 may output a first dimming control signal for performing the analog dimming, if the dimming-control voltage corresponding to the section of the first PWM signal of the control-pulse signal is in an analog dimming voltage area (A Dimming Area) which is between a set off-voltage value (Off) and the maximum voltage value (MAX). In the analog dimming, the driver 260 may control the output current supplied to the LED bar 113*a* in proportion to the dimming-control voltage. The maximum voltage value (MAX) corresponds to the maximum power value applicable to the LED bar 113*a* in the analog dimming. Here, the off-voltage value (Off) may be set to be higher than 0V. Further, if the LED bar 113*a* of the backlight unit is dimmed on the low-consumption power condition in accordance with the first setting value, the maximum voltage level of the dimming-control voltage supplied from the voltage generator 220 to the dimming controller 240 may correspond to the first setting value in the range VS, which is less than the maximum voltage value (MAX).

Further, the dimming controller 240 may output a second dimming control signal so that the driver 260 can turn off the LED bar 113*a*, if the dimming-control voltage supplied from the voltage generator 220 corresponding to an off-section (Off_p) of the second PWM signal PWM2 of the control-pulse signal is within a PWM dimming voltage area below the set off-voltage value (Off). Thus, the LED bar 113*a* is turned on in the on-section (On_P) of the second PWM signal PWM2 and tuned off in the off-section (Off_p), thereby performing the PWM dimming.

The dimming controller 240 receives a driving voltage from a voltage supplying portion 270. The voltage supplying portion 270 includes a coil 271 corresponding to a primary side of the transformer 265 of the driver 260, a first diode 273, and a second capacitor 275.

The dimming controller 240 may be implemented by a digital integrated circuit (IC) chip 241 such as a microprocessor that is configured to operate as described above.

As described above, the driver 260 controls the analog dimming and the PWM dimming of the LED bar 113*a* in accordance with the first and second dimming control signals output from the dimming controller 240. To this end, the driver 260 includes a switch 261 and a light source controller 264.

The switch 261 switches between on and off at a predetermined frequency in accordance with the first and second dimming control signals of the dimming controller 240, and switches off in accordance with the second dimming control signal. For example, the switch 261 may be implemented by a field effect transistor (FET), a source of which is grounded via a resistor 263.

The light source controller 264 is to supply operation power Vo to the LED bar 113*a* in accordance with the on and off operation of the switch 261, and includes a transformer 265, a second diode 267, and a third capacitor 269.

The transformer 265 transforms the DC voltage output from the rectifier 214 into a voltage having a level needed for driving the LED bar 113*a* and outputs the transformed voltage to the diode 267, as the switch 261 operates in accordance with the first and second dimming control signal of the dimming controller 240.

The third capacitor 269 smooths the DC voltage output from the second diode 267 and supplies the smoothed voltage as the operation power Vo to the LED bar 113*a* as the switch 261 operates.

With the foregoing configuration, the dimming-control voltage generator 215, the dimming controller 240 and the driver 260 may constitute one circuit having a single port. Therefore, the power supply 200 has a simpler circuit than the conventional power supply using the hybrid dimming method requiring both a circuit for the analog dimming and a circuit for the PWM dimming. As a result, the design and maintenance of the power supply 200 are much easier than a conventional hybrid power supply.

The power supply 200 according to the exemplary embodiments described here is not limited to a use for a display apparatus. For example, the power supply 200 according to an exemplary embodiment may be used for an illumination apparatus instead of the display apparatus 100.

Figure 6:
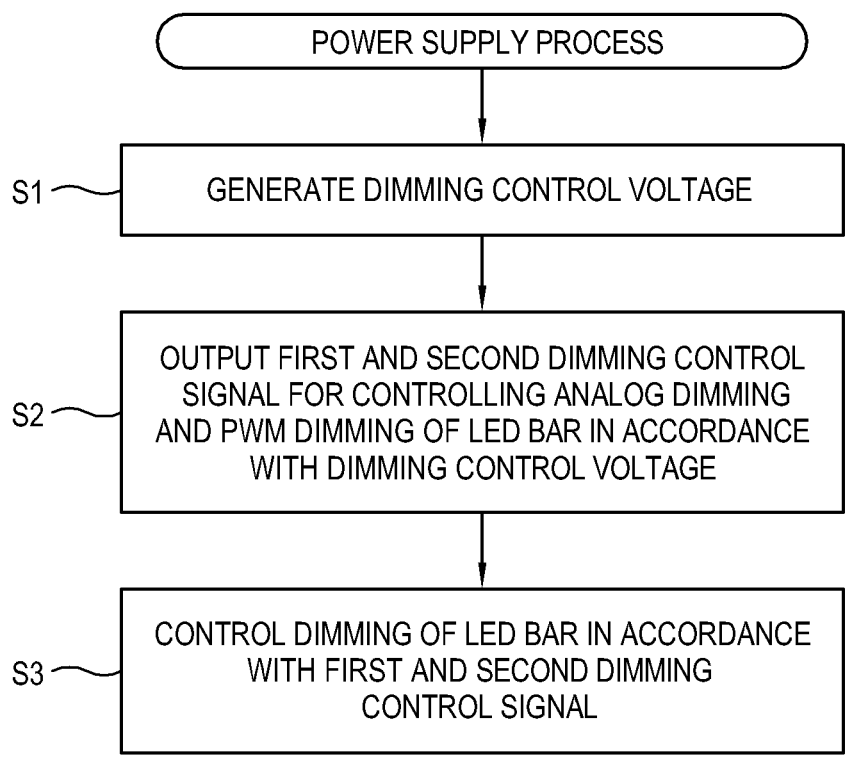
FIG. 6 is a flowchart of a power control method according to an exemplary embodiment.

Below, a power control method of the power supply 200 that supplies power to the light source of the display apparatus 100, i.e. to the LED bar 113a will be described in detail with reference to FIG. 6.

In operation S1, if the backlight power-adjustment value and the image brightness-adjustment value are input as the first and second adjustment values by a user, the dimming-control voltage generator 215 generates the control-pulse signal as shown in FIG. 3 based on the input values, generates the dimming-control voltage based on the control-pulse signal, and applies the dimming-control voltage to the dimming controller 240.

In operation S2, the dimming controller 240 outputs the first and second dimming control signals for controlling the analog dimming and the PWM dimming of the LED bar 113a in accordance with the dimming-control voltage supplied from the dimming-control voltage generator 215.

Specifically, the dimming controller 240 calculates the output current to be supplied to the LED bar 113a in accordance with the dimming-control voltage supplied from the dimming-control voltage generator 215, and outputs the dimming control signal for controlling the driver 260 in accordance with the calculated output current.

Here, as shown in FIG. 5, the dimming controller 240 may output the first dimming control signal to perform the analog dimming if the dimming-control voltage supplied from the dimming-control voltage generator 215 corresponding to the section of the first PWM signal of the control-pulse signal is within the analog dimming voltage area (A Dimming Area). In the analog dimming, the driver 260 may adjust the output current supplied to the LED bar 113a in proportion to the dimming-control voltage.

Further, the dimming controller 240 may output the second dimming control signal to perform the PWM dimming where the LED bar 113a is turned off by the driver 260, if the dimming-control voltage corresponding to the off-section Off_p of the second PWM signal PWM2 of the control-pulse signal is supplied from the dimming-control voltage generator 215 and the dimming-control voltage is within the PWM dimming voltage area, which is below the off voltage (Off).

In operation S3, the driver 260 controls the power supplied to the LED bar 113a so that the analog dimming and the PWM dimming of the LED bar 113a can be controlled in accordance with the first and second dimming control signals of the dimming controller 260.

That is, the driver 260 applies switching to the DC voltage output from the rectifier 214 through the switch 261 at a frequency corresponding to the first dimming control signal output from the dimming controller 240 so as to obtain a voltage having a level needed for driving the LED bar 113a, and supplies the obtained voltage as the operation power Vo to the LED bar 113a. Here, the LED bar 113a receives the output current changing in proportion to the dimming-control voltage.

Further, the driver 260 turns off the switch 262 to cut off the DC voltage provided from the rectifier 215 to the LED bar 113a in accordance with the second dimming control signal output from the dimming controller 240.

Figure 7:
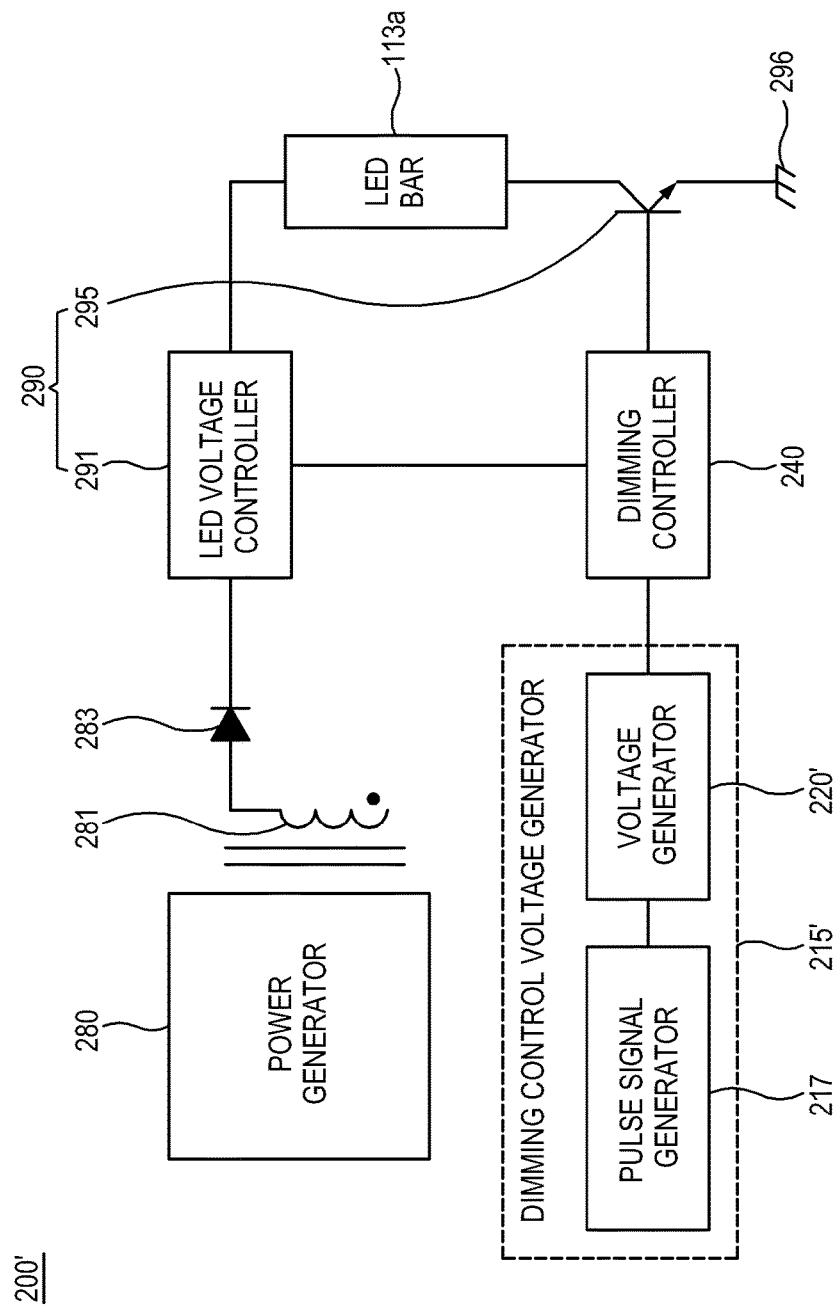
FIG. 7 is a circuit diagram of a power supply according to another exemplary embodiment.

FIG. 7 is a circuit diagram showing a power supply 200' according to another exemplary embodiment;

The power supply 200' according to an exemplary embodiment includes a dimming-control voltage generator 215', a dimming controller 240 and a LED driver 290, as a secondary control converter for transforming a power generated by a primary power generator 280, such as a quasi-resonant (QR) converter, an LLC flyback converter, etc., into a voltage having a level needed for the LED bar 113a and supplying the voltage to the LED bar 113a.

The power supply 200' includes the dimming controller 240 having the same configuration and operation as those of the power supply 200 shown in FIG. 2, except the dimming-control voltage generator 215' and the LED driver 290. Therefore, descriptions as to other elements than the dimming-control voltage generator 215' and the LED driver 290 will not be repeated here.

The dimming-control voltage generator 215' includes the pulse signal generator 217 and the voltage generator 220'. The pulse signal generator 217 is the same as that of the power supply of the power supply 200 shown in FIG. 2.

Figure 8:
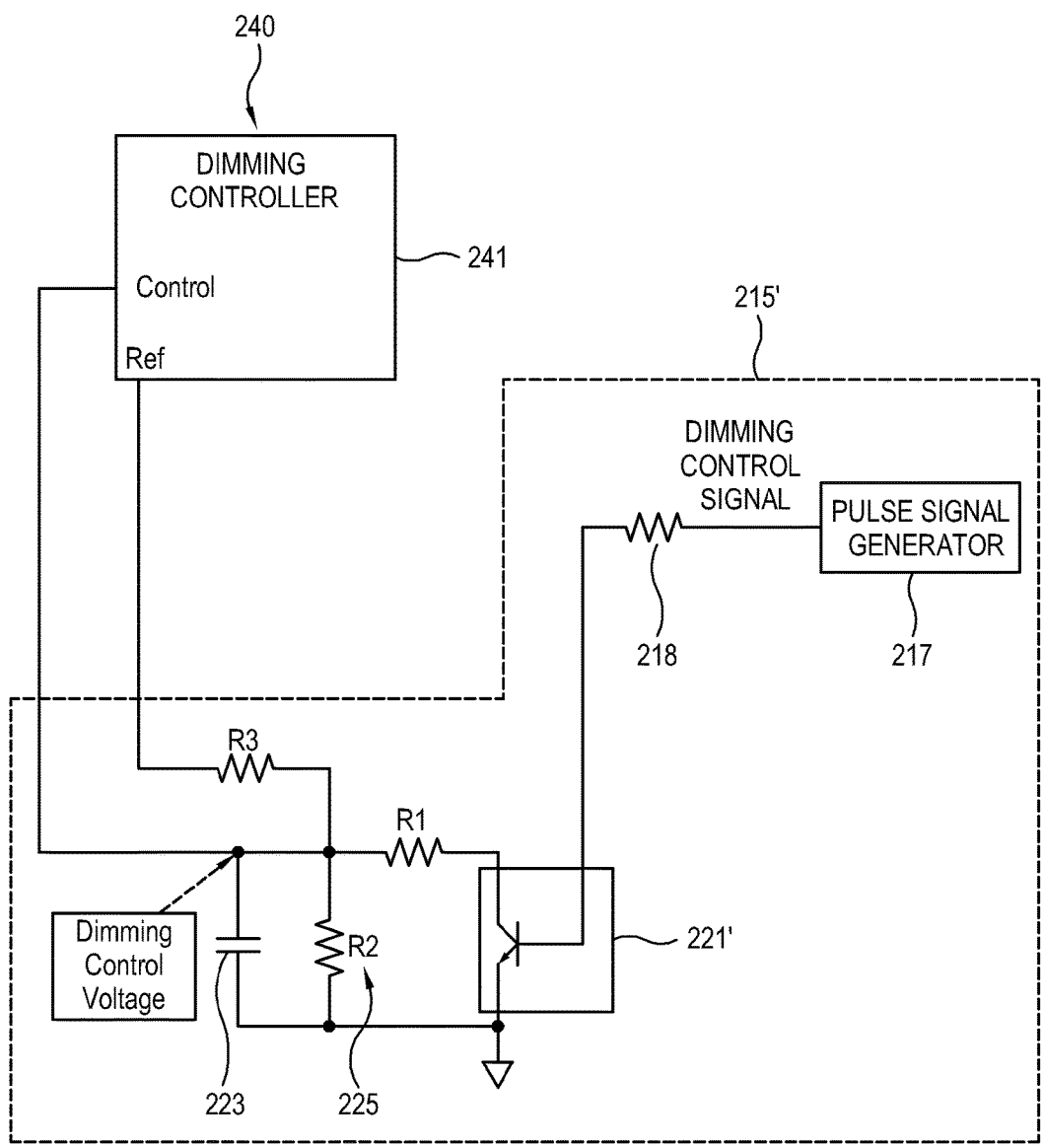
FIG. 8 is a partial circuit diagram of a dimming-control voltage generator in the power supply of FIG. 7.

As shown in FIG. 8, the voltage generator 220' is the same as the voltage generator 220 of the power supply 200 shown in FIG. 2 except that the photo coupler 221 is replaced by an FET 221'.

The LED driver 290 includes an LED voltage controller 291 and an LED switch 295.

The LED voltage controller 291 switches between on and off the connection to a power supplied from the primary power generator 280 via a coil 281 and a rectifying diode 283 at a predetermined frequency in accordance with the first dimming control signal of the dimming controller 240. The LED voltage controller 291 supplies this power to the LED bar 113a, thereby performing the analog dimming of the LED bar 113a.

The LED switch 295 switches on and off the LED bar 113a in accordance with the second dimming control signal output from the dimming controller 240, thereby performing the PWM dimming of the LED bar 113a. The LED switch 295 may be implemented with an FET of which a gate, a drain and a source are respectively connected to the dimming controller 240, the LED bar 113a and the ground 296.

The power supply 200' has the same operations as the power supply 200 as shown in FIG. 2, except that the LED voltage controller 291 and the LED switch 295 do not interwork and independently operate to perform the analog dimming and the PWM dimming of the LED bar 113a.

Figure 9:
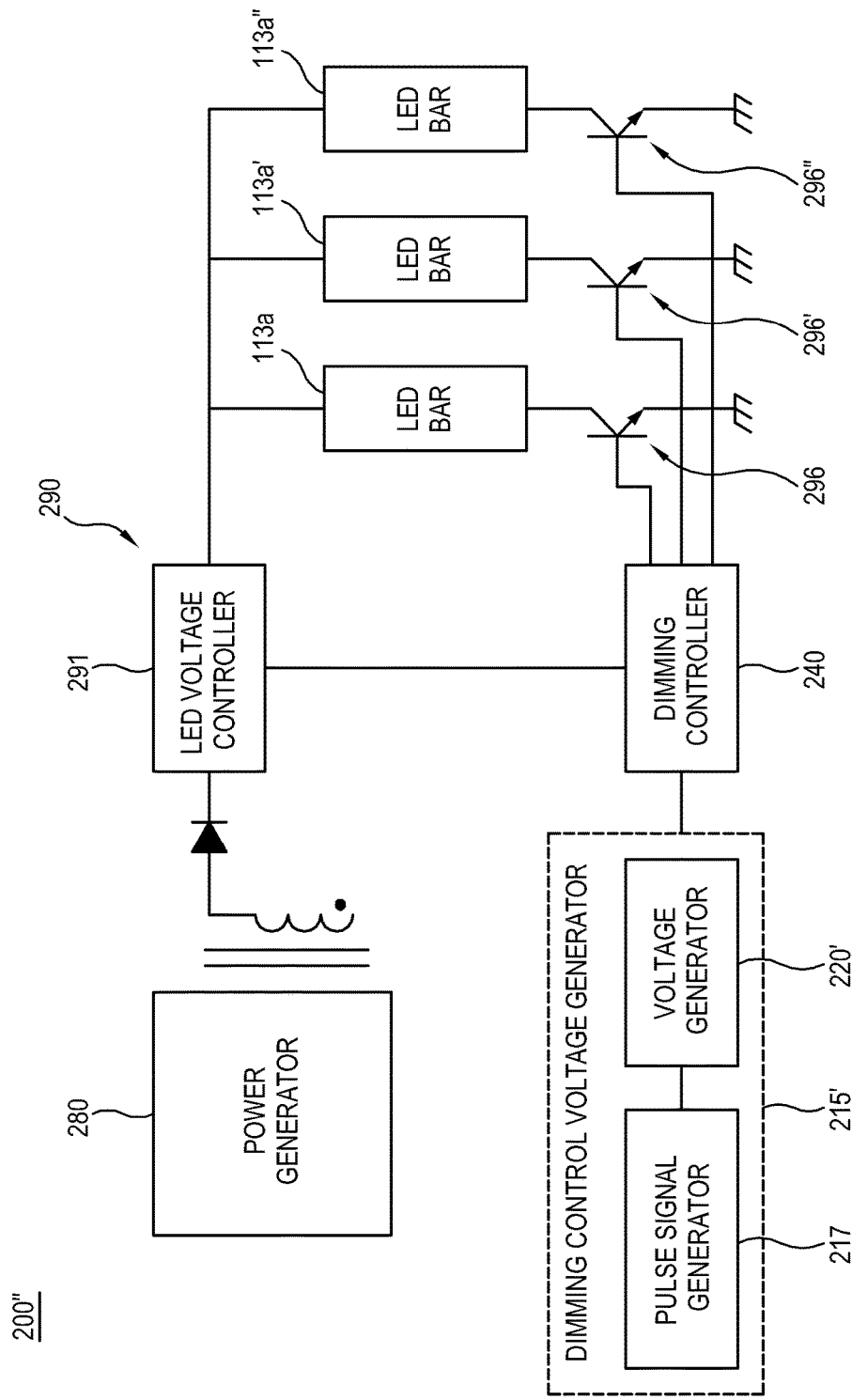
FIG. 9 is a circuit diagram of a power supply according to yet another exemplary embodiment.

A power supply according to an exemplary embodiment may drive more than one LED bar. For example, as shown in FIG. 9, a power supply 200" may drive a plurality of LED bars 113a, 113a' and 113a". In this case, the power supply 200" may be implemented by adding only the LED switches 296' and 296" to the power supply 200' shown in FIG. 7, without additional voltage controllers, in order to drive the LED bars 113a' and 113a". Therefore, the power supply 200" may be have a simpler structure than that of the power supply 200 of FIG. 2 that has to include the switch 261 and the light source controller 264 of the driver 260 with regard to each of the plurality of LED bars for multi-channels.

In the foregoing power supplies 200, 200' and 200" according to the exemplary embodiments, both the analog dimming and the PWM dimming may be performed by a single circuit with a single port. As a result, the power supply according to an exemplary embodiment has more simple circuit configuration. Also, its design and maintenance are easier than those of a conventional hybrid power supply because the conventional hybrid power supply requires both the circuit for the analog dimming and the circuit for the PWM dimming. Further, the power supply according to an exemplary embodiment controls both the analog dimming and the PWM dimming, and thus the response characteristics of the light source such as the LED bar 113a, 113a', 113a" of the backlight unit are improved to thereby obtain softer light emitting properties.

Although this disclosure has been particularly shown and described with reference to exemplary embodiments thereof, it will be appreciated by those skilled in the art that changes may be made in these exemplary embodiments without departing from the principles and spirit of the disclosure. Therefore, the foregoing has to be considered as illustrative only. The scope of the disclosure is defined in the appended claims and their equivalents. Accordingly, all suitable modification and equivalents may fall within the scope of the disclosure.

What is claimed is:

1. A power supply comprising:
   a dimming-control voltage generator configured to generate a dimming-control voltage according to a control pulse signal generated based on at least one adjustment value related to dimming of a light source;
   a dimming controller configured to output a dimming control signal for controlling analog dimming and pulse width modulation (PWM) dimming of the light source based on the dimming-control voltage; and
   a driver configured to control the analog dimming and the PWM dimming of the light source based on the dimming control signal,
   wherein the control pulse signal comprises a single synthesized signal in which a first PWM signal for controlling an analog dimming and a second PWM signal for controlling a PWM dimming are mixed so that the first PWM signal constitutes an on-section of the second PWM signal,
   wherein the dimming-control voltage generator comprises:
      a pulse signal generator configured to generate the control-pulse signal based on the at least one adjustment value; and
      a voltage generator configured to generate the dimming-control voltage based on the control-pulse signal generated by the pulse signal generator, and
   wherein the voltage generator comprises:
      a photo coupler configured to be turned on and off in accordance with pulses of the control-pulse signal;
      a capacitor configured to smooth a voltage output from the photo coupler when the photo coupler is turned on; and
      at least one resistor configured to connect with the photo coupler and adjust the voltage output from the photo coupler to generate the dimming control voltage.

2. The power supply according to claim 1, wherein the at least one adjustment value comprises an image brightness-adjustment value and a light-source power-adjustment value.

3. The power supply according to claim 1, wherein the pulse signal generator comprises one of a brightness controller included in a signal processor for processing a video signal, and a brightness controller for controlling the brightness of the light source.

4. The power supply according to claim 1, wherein the first PWM signal has a first duty ratio for controlling the analog dimming and the second PWM signal has a second duty ratio for controlling the PWM dimming.

5. The power supply according to claim 4, wherein the voltage generator generates the dimming-control voltage based on an average level voltage of the first PWM signal.

6. The power supply according to claim 1, wherein the dimming controller calculates an output current to be supplied to the light source based on the dimming-control voltage, and outputs the dimming control signal based on the calculated output current.

7. The power supply according to claim 6, wherein the dimming controller outputs a first dimming control signal for the analog dimming of the light source when the dimming-control voltage is within a predetermined analog dimming voltage area.

8. The power supply according to claim 7, wherein the driver controls power supplied to the light source to be changed in proportion to the dimming-control voltage based on the first dimming control signal output from the dimming controller.

9. The power supply according to claim 7, wherein the dimming controller outputs a second dimming control signal for the PWM dimming of the light source when the dimming-control voltage is within a PWM dimming voltage area below a predetermined voltage.

10. The power supply according to claim 9, wherein the driver controls the light source to be turned off based on the second dimming control signal output from the dimming controller.

11. The power supply according to claim 6, wherein the driver comprises:
    a switch configured to switch on and off based on the dimming control signal; and
    a light source controller to control the analog dimming and PWM dimming of the light source using on and off switching of the switch.

12. The power supply according to claim 11, wherein the light source controller comprises
    a transformer configured to transform power into a voltage having a level needed for dimming the light source; and
    a capacitor configured to smooth the voltage output from the transformer and supply the smoothed voltage to the light source.

13. The power supply according to claim 6, wherein the driver comprises
    a voltage controller configured to control the analog dimming of the light source based on a first dimming control signal output from the dimming controller; and
    a switch configured to control the PWM dimming of the light source based on a second dimming control signal output from the dimming controller.

14. The power supply according to claim 13, wherein the switch comprises a field effect transistor (FET) configured to switch on and off based on the second dimming control signal.

15. The power supply according to claim 13, wherein the light source comprises a plurality of power channels.

16. The power supply according to claim 1, further comprising:
    a user input receiver configured to receive the at least one adjustment value as a user input.

17. A power control method of a power supply, comprising:
    generating, by a dimming-control voltage generator, a dimming-control voltage according to a control pulse signal generated based on at least one adjustment value related to dimming of a light source;

outputting, by a dimming controller, a dimming control signal for controlling analog dimming and pulse width modulation (PWM) dimming of the light source based on the generated dimming-control voltage; and controlling, by a driver, the analog dimming and the PWM dimming of the light source based on the output dimming control signal, wherein the control pulse signal comprises a single synthesized signal in which a first PWM signal for controlling an analog dimming and a second PWM signal for controlling a PWM dimming are mixed so that the first PWM signal constitutes an on-section of the second PWM signal, wherein the dimming-control voltage generator comprises:
- a pulse signal generator configured to generate the control-pulse signal based on the at least one adjustment value; and
- a voltage generator configured to generate the dimming-control voltage based on the control-pulse signal generated by the pulse signal generator, and wherein the voltage generator comprises:
- a photo coupler configured to be turned on and off in accordance with pulses of the control-pulse signal;
- a capacitor configured to smooth a voltage output from the photo coupler when the photo coupler is turned on; and
- at least one resistor configured to connect with the photo coupler and adjust the voltage output from the photo coupler to generate the dimming control voltage.

18. The power control method according to claim 17, wherein the at least one adjustment value comprises an image brightness-adjustment value and a light-source power-adjustment value.

19. The power control method according to claim 17, wherein the generating the dimming-control voltage comprises generating the control-pulse signal based on the adjustment values; and
generating the dimming-control voltage based on the generated control-pulse signal.

20. The power control method according to claim 17, wherein the outputting the dimming control signal comprises calculating an output current to be supplied to the light source based on the dimming-control voltage, and outputting the dimming control signal based on the calculated output current.

21. The power control method according to claim 20, wherein the outputting the dimming control signal comprises outputting a first dimming control signal for the analog dimming of the light source when the dimming-control voltage is within a predetermined analog dimming voltage area.

22. The power control method according to claim 21, wherein the controlling comprises controlling power supplied to the light source to be changed in proportion to the dimming-control voltage based on the output first dimming control signal.

23. The power control method according to claim 20, wherein the outputting the dimming control signal comprises outputting a second dimming control signal for the PWM dimming of the light source when the dimming-control voltage is within a PWM dimming voltage area below a predetermined voltage.

24. The power control method according to claim 23, wherein the controlling comprises controlling the light source to be turned off based on the output second dimming control signal.

25. A display apparatus comprising:
a signal receiver configured to receive a video signal;
a signal processor configured to process a video signal received in the signal receiver;
a display configured to display an image based on the video signal processed by the signal processor, comprising a display panel and a light source for illuminating the display panel, and; and
a power supply configured to supply the operation power for driving the light source of the display,
wherein the power supply comprises:
a dimming-control voltage generator configured to generate a dimming-control voltage according to a control pulse signal generated based on at least one adjustment value related to dimming of a light source;
a dimming controller configured to output a dimming control signal for controlling analog dimming and pulse width modulation (PWM) dimming of the light source based on the dimming-control voltage; and
a driver configured to control the analog dimming and the PWM dimming of the light source based on the dimming control signal,
wherein the control pulse signal comprises a single synthesized signal in which a first PWM signal for controlling an analog dimming and a second PWM signal for controlling a PWM dimming are mixed so that the first PWM signal constitutes an on-section of the second PWM signal,
wherein the dimming-control voltage generator comprises:
- a pulse signal generator configured to generate the control-pulse signal based on the at least one adjustment value; and
- a voltage generator configured to generate the dimming-control voltage based on the control-pulse signal generated by the pulse signal generator, and
wherein the voltage generator comprises:
- a photo coupler configured to be turned on and off in accordance with pulses of the control-pulse signal;
- a capacitor configured to smooth a voltage output from the photo coupler when the photo coupler is turned on; and
- at least one resistor configured to connect with the photo coupler and adjust the voltage output from the photo coupler to generate the dimming control voltage.

* * * * *